Sept. 17, 1946. R. J. STEWART 2,407,751
DUST COLLECTOR
Filed Oct. 7, 1943 3 Sheets-Sheet 1
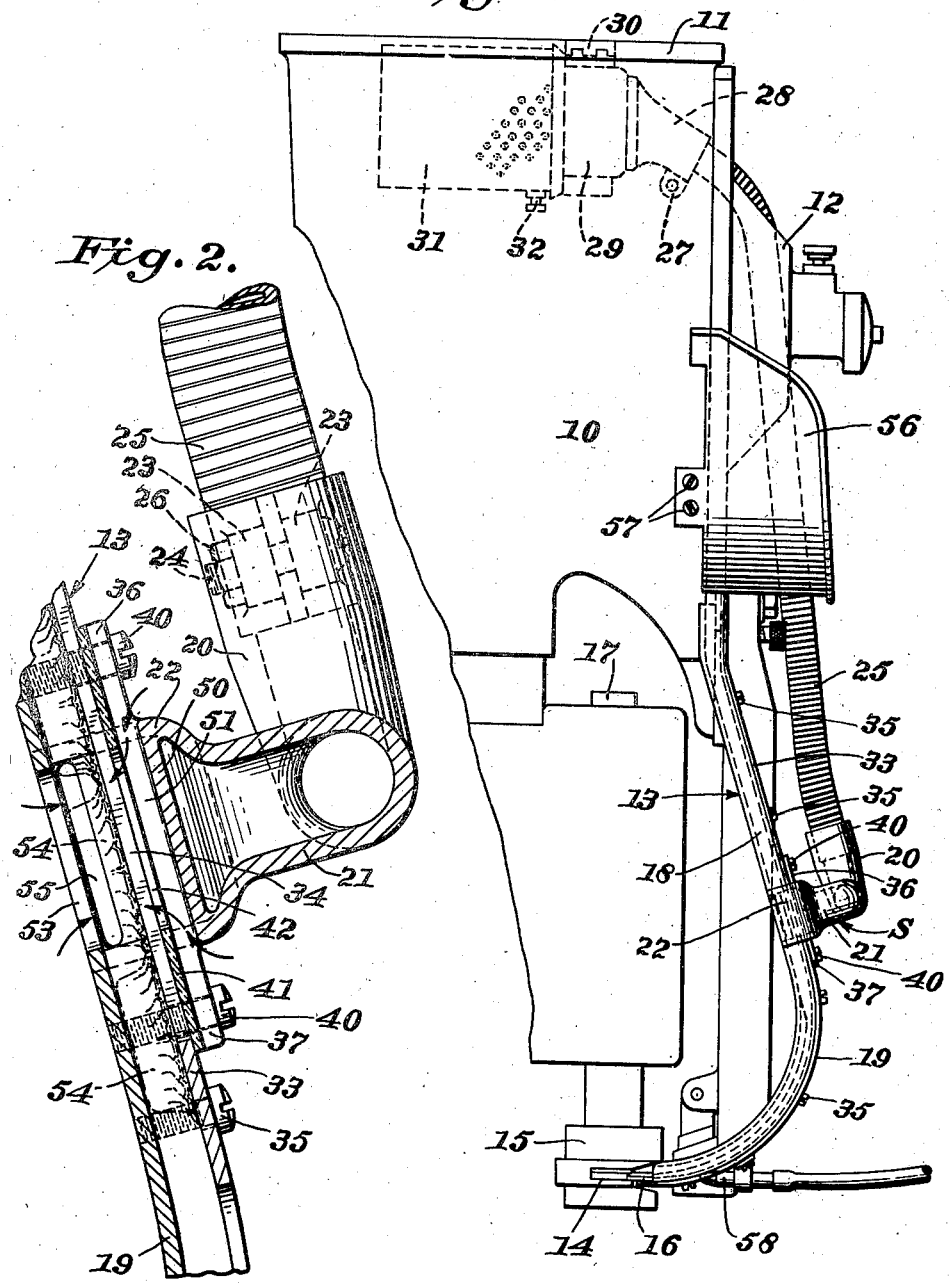
Inventor:
Robert J. Stewart,
By Cushman ... Attorneys.

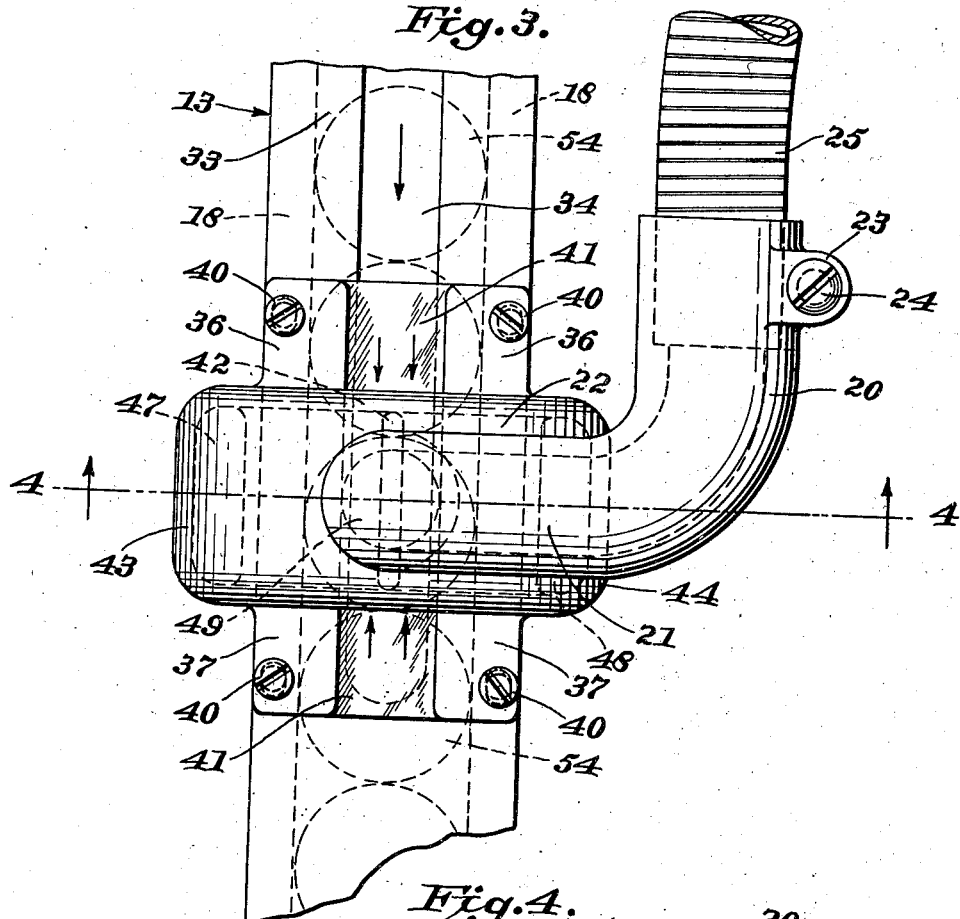
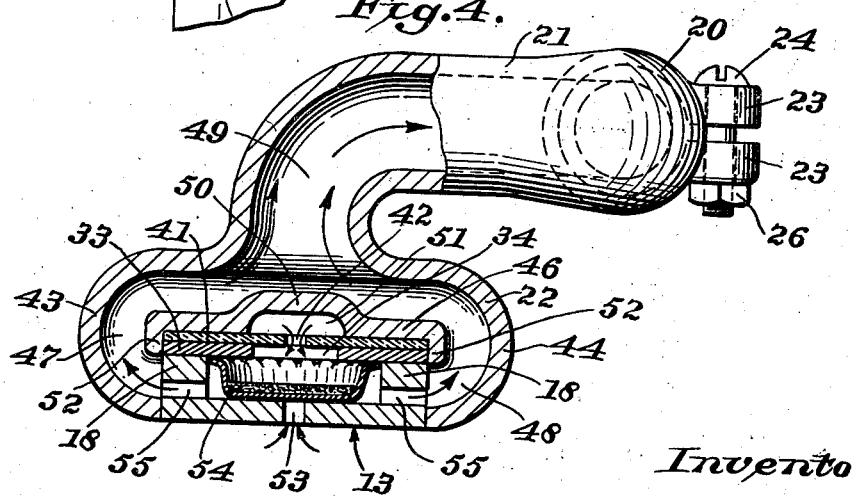

Sept. 17, 1946.　　　　R. J. STEWART　　　　2,407,751
DUST COLLECTOR
Filed Oct. 7, 1943　　　　3 Sheets-Sheet 3
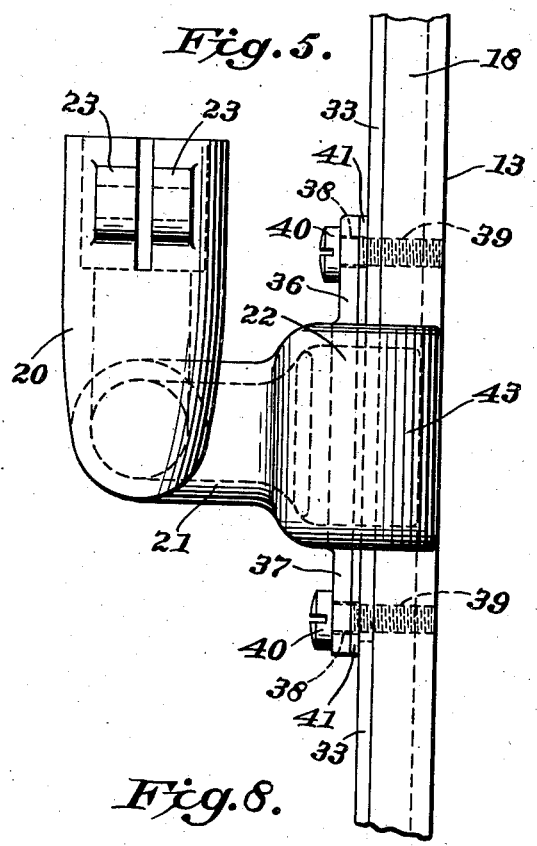
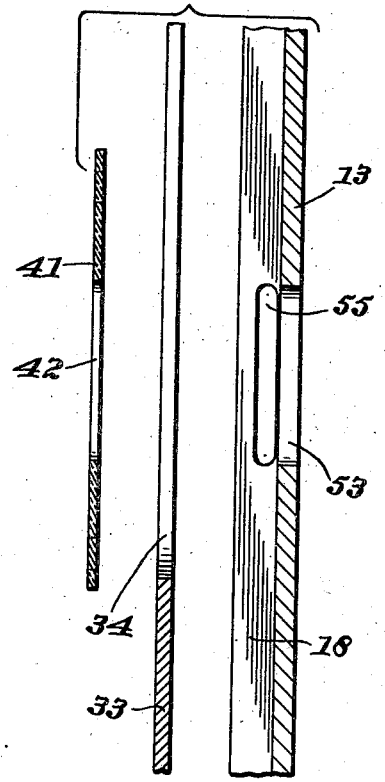
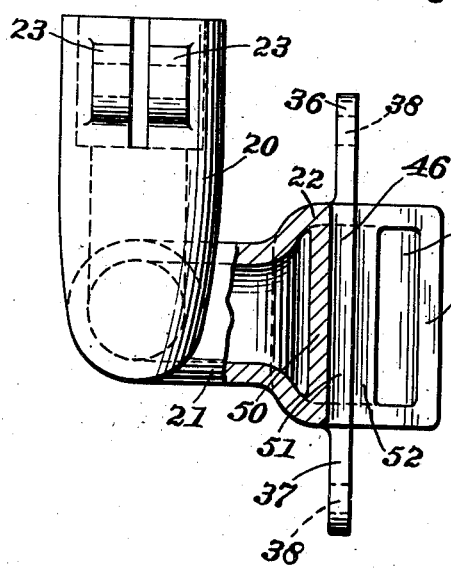
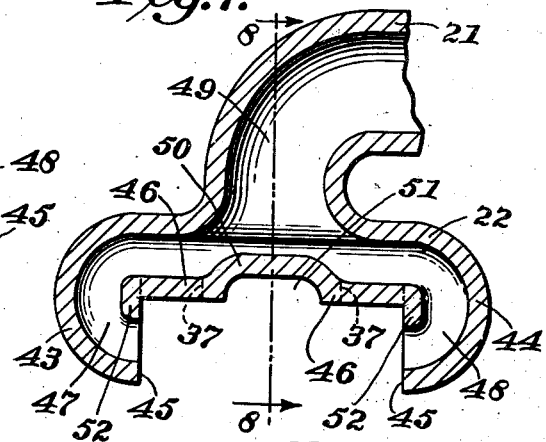
Inventor:
Robert J. Stewart,
By _(signature)_
Attorneys.

Patented Sept. 17, 1946

2,407,751

UNITED STATES PATENT OFFICE 2,407,751

DUST COLLECTOR

Robert J. Stewart, Baltimore, Md., assignor to Crown Cork & Seal Company, Baltimore, Md., a corporation of New York Application October 7, 1943, Serial No. 505,375

9 Claims. (Cl. 226—129)

The present invention relates to machines for applying closures, such as crowns and caps, to containers and is more particularly directed to improved means for preventing dust or foreign matter from entering the container during the crowning operation.

Crowning machines comprise a hopper from which crowns are passed by gravity through a chute to a crown head. The present invention contemplates the association with such a chute of means for removing therefrom and from the crowns which pass therethrough any foreign matter which may tend to travel from the chute into the crowning heads.

In machines of this character, when the crowns or caps are dumped into the hopper and the machine is started, considerable cork dust and small lacquer flakes are knocked off the crowns by the continuous agitation of the crowns in the hopper chamber. Unless this dust is removed, it is carried down the crown chute and is deposited on parts of the machine and may find its way into the open bottles or containers and soil their contents.

Accordingly, an essential feature of the present invention consists in associating with the feed chute that conducts the closures from the hopper to the capping head, suction means which communicates with the chute to remove dust and other foreign matter from the chute and the closures, and associating with the suction means, means for introducing air into the chute on opposite sides of the closures so as to provide a balanced pressure around the closures in order to remove the dust and foreign matter without interfering with the travel of the closures through the chute.

The use of compressed air jets to accelerate the travel of the closures through the chute, has been found objectionable in that the air blast subjects the closures to an unbalanced pressure which tends to retard the passing of the closures through the chutes. The present invention dispenses with the use of such air jets, and associates with the chute a suction conduit having a suction head which communicates with the interior of the chute. The chute and suction head are provided with air openings disposed on opposite sides of the closures so as to insure the pressure being equalized entirely around the closures and in such a manner that the vacuum pressure is drawn around all sides of the closures uniformly and is not displaced towards one side of the chute. Thus simple, efficient, and positive means are provided which dispenses with the use of an accelerated air blast for feeding the closures through the chute, and which removes the dust and other foreign matter without interfering with the travel of the crowns through the chute.

Another object comprehends the provision of a suction conduit having a suction head provided with a baffle member for forming passages which communicate with complementary passages or openings in the side of the chute, and which may be readily connected to chutes of various types to provide a balanced pressure therein to remove the dust from the chutes and the closures as the latter pass through the chute.

Other objects and advantages of the invention will become apparent from the following description, when taken in conjunction with the accompanying claims and drawings:

Referring to the drawings, in which is shown a preferred embodiment of the invention:

Figure 1 is a side view of a capping machine showing the dust collector attached thereto;

Figure 2 is an enlarged vertical sectional view of the suction conduit showing its connection with the chute;

Figure 3 is a front view of Figure 2;

Figure 4 is a sectional view taken substantially along the line 4—4 of Figure 3;

Figure 5 is an end view of Figure 3;

Figure 6 is a detail exploded view showing the chute, cover, and spacer plate in section;

Figure 7 is a detail sectional view similar to Figure 4 showing the suction conduit with the chute removed, and Figure 8 is a sectional view taken substantially along line 8—8 of Figure 7.

Referring to the drawings, in which like numerals designate like parts in the several views, 10 indicates a capping machine of any well-known type, which has a hopper 11 for receiving the crown or caps. A revoluble drum or perforated dial 12 is associated with the hopper so as to successively distribute the crowns to a feed chute 13 which conducts them to the throat 14 of a rotating capping or crowning head 15. The capping head may be of the usual construction and has a series of throats 14 disposed so as to successively register with the mouth or delivery end 16 of the chute. Each of the capping heads has a reciprocating plunger 17 for applying the crowns or caps to a bottle carried by a rotatable table, not shown, and which is movable beneath the capping head during the operation of the machine. The chute 13 has the spaced sides or flanges 18 and a downwardly curved portion 19 adjacent the capping head 15.

In order to remove dirt and foreign particles from the chute and closures as the latter are fed from the hopper to the capping head, so as to exclude the possibility of contaminating the contents of the bottles or receptacles, the chute 13 has detachably connected to it preferably adjacent the capping head 15 and above the curved portion 19, suction means S (Fig. 1). This suction means comprises a conduit having an upwardly extending tubular portion 20 and a substantially horizontal portion 21 which terminates in an elongated transversely disposed head or casing 22 that extends beyond the sides of the chute (Fig. 3). The outer or upper end of the conduit portion 20 is slit and has the spaced lugs 23 provided with aligned openings for receiving the threaded bolt 24 (Fig. 4). One end of a flexible metallic hose 25 extends into the conduit portion 20 and is clamped therein upon the tightening of a nut 26 on the bolt 24. The upper end of the hose 25 is clamped as at 27 to the nozzle 28 of a suction fan or pump 29 secured by the bracket 30 to one side of the hopper 11. A dust collector 31 detachably connected to the fan by the set screw 32 is arranged to receive the dust and foreign particles removed from the chute and the crowns through the hose 25 when the device is in operation.

The open side of the chute 13 is preferably closed by a cover 33 having a relatively wide elongated central slot or opening 34 and which is secured to the sides 18 of the chute in any suitable manner such as by the screws 35. The suction head or casing 22 extends outwardly from opposite sides of the chute, and has a pair of spaced upper lugs 36 and a pair of spaced lower lugs 37. These lugs are positioned so as to rest on the upper surface of the sides 18 of the chute and are provided with openings 38 (Fig. 5) which register with threaded openings 39 in the sides 18 of the chute to receive the threaded bolts 40 for detachably securing the suction conduit to the chute above the curved portion 19, so as to allow convenient access to the chute for the purpose of inspection or repair. A spacer member, such as a pyralin plate 41, is positioned between the suction head 22 and the cover 33 and has an elongated opening 42 which registers with the slot 34, but which preferably is of less length and width than the slot 34. The plate 41 is clamped in position by the bolts 40. Within the suction head 22 and extending longitudinally thereof is a baffle or web member 46 which terminates short of the curved sides 43 and 44 of the head so as to be spaced therefrom in order to provide side passages 47 and 48 within the suction head 22 that merge centrally with the suction passage 49 of the conduit portion 21. The baffle 46 has a centrally offset portion 50 which provides an air opening or inlet 51 when the parts are assembled, that extends vertically through the suction head 22 between the lugs 36 and 37. The baffle member 46 also is provided with side or end flanges 52 which are spaced apart the width of the sides of the chute, so that when the parts are assembled, the flanges 52 engage the sides of the cover 33 and the plate 41 (Fig. 4) in order to maintain them properly in position. The central opening 51 in the baffle member is positioned on the outside of the plate 41 so that air may be conducted into the chute through both ends of the opening 51 and from opposite sides of the suction head 22 in the manner as shown by the arrows in Fig. 3. The bottom of the chute 13 has a centrally disposed elongated slot 53 which aligns with the slots 34 and 42 in the cover and plate, respectively, and is arranged to conduct air into the chute on the side of the closures 54 opposite to the air passage 51. The sides 18 of the chute are also provided with elongated slots 55 which communicate with the passages 47 and 48 of the suction head 21 (Fig. 4).

When the apparatus is in operation, the closures 54 are fed singly downward through the chute from the hopper 11 to the capping head 15 and as each passes the suction head 22, the suction created by the fan 29 acts to remove the dust and foreign particles from the chute and the closures through the passages 47 and 48 and the central opening 49 so as to conduct the dust through the conduit and hose 25 to the collector 31. At the same time, outside air is introduced into the chute on opposite sides of the closures 54 through the vertical through opening 51 in the suction head and the opening 53 in the bottom of the chute, thus providing simple, efficient and positive means for equalizing or balancing the air pressure and suction pressure on all sides of the closures as they pass the suction head. As this pressure is uniformly drawn around all sides of the closures or crowns and is not displaced on one side more than another, the dust and foreign particles are removed from the chute and closures without interfering with the downward travel of the closures through the chute.

A semi-circular guard plate 56 may be secured as at 57 to the side of the machine to prevent the dust passing through the hopper dial 12 from falling onto the bottles and the lower portion of the machine during the capping operation. As the crowns pass the bent portion 19 of the chute they may be fed to the capping head by air under pressure introduced into the end of the chute through the nozzle 58.

The suction conduit 5 may be installed as a permanent part of the feed chute, or can be readily attached to any conventional type of filling or crowning machine at a minimum expenditure of time and effort. Moreover, by reason of the balanced pressure applied uniformly to all sides of the closures as they pass the suction means, efficient and economical means are provided for insuring the withdrawal of dust and foreign particles from the closures without retarding the downward movement of the closures through the chute, as would be the case if air jets were utilized to assist the feeding of the closures through the chute. The suction means S is located closer to the capping head 15 than to the hopper 11 so as to remove the dust and foreign particles which might collect in the chute and on the closures before the latter are delivered to the capping machine.

For the purpose of illustration, the dust collector has been shown attached to an accepted type of bottling machine. However, it will be manifest that the suction means and its associated parts may be equally applied and used with any machine for automatically applying closures to bottles or the like and in which the closures or crowns are successively fed to the capping means. Moreover, such changes as fall within the purview of one skilled in the art may be made without departing from the spirit of the invention as covered by the following claims.

I claim:

1. In combination with a capping machine having a closure hopper and a capping head, a feed chute for conducting the closures from the hopper to the capping head, suction means communicating with said chute for removing dust and foreign particles from the chute and closures, and means for providing a balanced pressure around the closures as the latter pass the suction means, so as to withdraw the dust from the chute and closures without interfering with the travel of the closures through the chute.

2. In combination with a capping machine having a closure hopper and a capping head, a feed chute for conducting the closures from the hopper to the capping head, and suction means communicating with said chute for removing dust and foreign particles from the chute and the closures, said suction means including a suction conduit having a suction head communicating with the interior of the chute, said suction head and chute having air openings for equalizing the pressure around the closures as the latter pass the suction means so as to withdraw the dust from the chute and closures without interfering with the travel of the closures through the chute.

3. In combination with a capping machine having a closure hopper and a capping head, a feed chute for conducting the closures from the hopper to the capping head, and suction means communicating with said chute for removing dust and foreign particles from the chute and the closures, said suction means including a suction conduit having a suction head communicating with the interior of the chute, said chute and suction head having air openings on opposite sides of the closures to provide a balanced pressure around the closures so as to remove the dust from the chute and closures without interfering with the travel of the closures through the chute.

4. In combination with a capping machine having a closure hopper and a capping head, a feed chute for conducting the closures from the hopper to the capping head, said chute having openings in the sides and bottom thereof, a suction conduit having a suction head adjacent said openings, said suction head having a baffle therein spaced from its sides to provide passages registering with the openings in the sides of the chute, a cover for the chute provided with a longitudinal slot, said suction head having an air opening registering with said slot and coacting with the opening in the bottom of the chute for introducing air into the chute on opposite sides of the closures, means connecting the suction conduit and cover to the chute, and means for creating a suction pressure in the conduit and the chute, the parts being constructed and arranged to provide equalization of air pressure and suction pressure on the closures as the latter pass the suction head so as to withdraw dust and foreign particles from the chute and closures without interfering with the travel of the closures through the chute.

5. In combination with a capping machine having a closure hopper and a capping head, a feed chute for conducting the closures from the hopper to the capping head, said chute having openings in the sides and bottom thereof, a suction conduit having a suction head adjacent said openings, said suction head having a baffle therein spaced from its sides to provide passages registering with the openings in the sides of the chute, a cover for the chute provided with a longitudinal slot, said suction head having an air opening in front of said cover registering with said slot and coacting with the opening in the bottom of the chute for introducing air into the chute on opposite sides of the closures, a spacer plate between the cover and the suction head and having a slot registering with the slot in said cover, means connecting the cover, spacer plate and suction head to the chute, and means for creating a suction pressure in the conduit and the chute, the parts being constructed and arranged to provide equalization of air pressure and suction pressure on the closures as the latter pass the suction head so as to withdraw dust and foreign matter from the chute and closures without interfering with the travel of the closures through the chute.

6. In combination with a capping machine having a closure hopper and a capping head, a feed chute for conducting the closures from the hopper to the capping head, said chute having openings in the sides and bottom thereof, a suction conduit having a transversely disposed suction head extending outwardly from the sides of the chute adjacent said openings, said suction head having a baffle therein spaced from its sides to provide passages registering with the openings in the sides of the chute, a cover for the chute having a longitudinal slot, said suction head having an air opening in front of said cover registering with said slot, the opening in said suction head coacting with the opening in the bottom of the chute for introducing air into the chute on opposite sides of the closures, means connecting the suction head and cover to the side of the chute, and means for creating a suction pressure in the conduit and chute, the parts being constructed and arranged to provide equalization of air pressure and suction pressure on the closures as the latter pass the suction head so as to withdraw dust and foreign matter from the chute and closures without interfering with the travel of the closures through the chute.

7. In combination with a capping machine having a closure hopper and a capping head, a feed chute for conducting the closures from the hopper to the capping head, a suction conduit having a suction head communicating with the interior of the chute, said suction head having a longitudinally disposed baffle therein extending short of the ends of the head to form side passages communicating with the conduit, means connecting the suction conduit to the chute, said suction head between the connecting means having a through opening for introducing air into the suction head and chute on one side of the closures, said chute having an opening on the opposite side of the closures for conducting air into the chute, and the sides of the chute having openings communicating with said passages, the parts being constructed and arranged to provide equalization of air pressure and suction pressure around the closures as the latter pass through the suction head, so as to withdraw the dust from the chute and the closures without interfering with travel of the closures through the chute.

8. In combination with a capping machine having a closure hopper and a capping head, a feed chute for conducting the closures from the hopper to the capping head, said chute having openings in the bottoms and sides thereof, a suction conduit having a transversely disposed suction head connected to the chute adjacent said openings and extending outwardly therefrom, said suction head having a longitudinally disposed baffle therein spaced from the sides of the head to provide passages registering with the openings in the sides of the chute, said baffle having a centrally disposed offset portion, a cover for the chute having a longitudinal slot, a spacer member having a slot registering with the slot in said cover, said baffle having side flanges engaging the adjacent edges of said cover and said spacer member, means for connecting the cover, spacer member, and suction head to the sides of the chute, said suction head having an air opening registering with said slots and coacting with the openings in the bottom of the chute for introducing air into the chute on opposite sides of the closures, and means for creating a suction pressure in the conduit and the chute, the parts being constructed and arranged to provide equalization of pressure on the closures as the latter pass the suction head so as to withdraw the dust from the chute and the closures without interfering with the travel of the closures through the chute.

9. A suction conduit adapted to be connected to a feed chute, said conduit having an upwardly extending portion and a substantially horizontal portion, said horizontal portion terminating in a transversely disposed suction head, said head having a baffle member therein spaced from its sides to provide passages communicating with the horizontal portion, said baffle member having a centrally closed offset portion extending through the suction head to provide air inlets at both ends thereof, said head having a vertical through opening adjacent the baffle member, and the outer ends of said passages being opened and spaced from each other.

ROBERT J. STEWART.